United States Patent
Winokur

(10) Patent No.: US 8,289,694 B2
(45) Date of Patent: Oct. 16, 2012

(54) DISASTER-PROOF STORAGE UNIT HAVING TRANSMISSION CAPABILITIES

(75) Inventor: Alex Winokur, Haifa (IL)

(73) Assignee: Axxana (Israel) Ltd., Tel Aviv (IL)

( * ) Notice: Subject to any disclaimer, the term of this patent is extended or adjusted under 35 U.S.C. 154(b) by 245 days.

(21) Appl. No.: 12/647,565

(22) Filed: Dec. 28, 2009

(65) Prior Publication Data

US 2010/0172084 A1     Jul. 8, 2010

Related U.S. Application Data

(60) Provisional application No. 61/142,410, filed on Jan. 5, 2009.

(51) Int. Cl.
*G06F 1/16* (2006.01)

(52) U.S. Cl. ............... 361/679.35; 370/315; 340/540; 257/756; 250/504 R

(58) Field of Classification Search ........... 370/352, 370/331, 252, 315; 340/573.1, 870.17, 540, 340/539.12, 870.16; 257/213, 3, 734, 706, 257/756, 690, 635, 640, 773; 361/707, 679.55, 361/679.21, 679.31, 679.32, 679.33, 679.34, 361/679.35; 174/36, 15.5, 15.6, 391, 1; 385/14, 385/18, 37, 114; 250/338.3, 332, 504 R, 250/495.1; 62/3.3, 126

See application file for complete search history.

(56) References Cited

U.S. PATENT DOCUMENTS

| | | | |
|---|---|---|---|
| 5,027,104 A | 6/1991 | Reid | |
| 5,546,533 A | 8/1996 | Koyama | |
| 5,594,900 A | 1/1997 | Cohn et al. | |
| 5,623,597 A | 4/1997 | Kikinis | |
| 5,724,501 A | 3/1998 | Dewey et al. | |
| 5,799,141 A | 8/1998 | Galipeau et al. | |
| 5,841,768 A | 11/1998 | Ozluturk et al. | |
| 5,889,935 A | 3/1999 | Ofek et al. | |
| 6,105,078 A | 8/2000 | Crockett et al. | |
| 6,144,999 A | 11/2000 | Khalidi et al. | |
| 6,158,833 A | 12/2000 | Engler | |
| 6,173,377 B1 | 1/2001 | Yanai et al. | |
| 6,226,651 B1 | 5/2001 | Masuda et al. | |
| 6,260,125 B1 | 7/2001 | McDowell et al. | |

(Continued)

FOREIGN PATENT DOCUMENTS

EP     0420425 A2     4/1991

(Continued)

OTHER PUBLICATIONS

U.S. Appl. No. 10/585,587 Official Action dated Jul. 12, 2009.

(Continued)

*Primary Examiner* — Hung Duong
(74) *Attorney, Agent, or Firm* — D. Kligler I.P. Services Ltd.

(57) ABSTRACT

A storage device includes a memory and a wireless transmitter, both contained in a disaster-proof enclosure. The memory is configured to receive and store data, and the wireless transmitter is coupled to read and transmit the data from the memory. The disaster-proof enclosure is surrounded by a thermally-insulating layer, and is configured to protect the memory and the transmitter from environmental conditions caused by a disaster event, such that the memory and the wireless transmitter remain functional during and after the disaster event and the transmitter is able to transmit at least a portion of the data to a receiver from within the disaster-proof enclosure after the disaster event.

23 Claims, 5 Drawing Sheets

U.S. PATENT DOCUMENTS

| | | | |
|---|---|---|---|
| 6,324,654 | B1 | 11/2001 | Wahl et al. |
| 6,389,552 | B1 | 5/2002 | Hamilton et al. |
| 6,580,450 | B1 | 6/2003 | Kersting et al. |
| 6,658,590 | B1 | 12/2003 | Sicola et al. |
| 6,684,306 | B1 | 1/2004 | Nagasawa et al. |
| 6,816,480 | B1 * | 11/2004 | Monroe et al. ............. 370/352 |
| 6,842,825 | B2 | 1/2005 | Geiner et al. |
| 6,859,865 | B2 | 2/2005 | De Margerie |
| 6,954,875 | B2 | 10/2005 | Liu |
| 6,976,186 | B1 | 12/2005 | Gardner |
| 7,020,743 | B2 | 3/2006 | Lee et al. |
| 7,065,589 | B2 | 6/2006 | Yamagami |
| 7,111,189 | B1 | 9/2006 | Sicola et al. |
| 7,148,802 | B2 | 12/2006 | Abbruscato et al. |
| 7,185,228 | B2 | 2/2007 | Achiwa |
| 7,188,292 | B2 | 3/2007 | Cordina et al. |
| 7,383,405 | B2 | 6/2008 | Vega et al. |
| 7,451,355 | B1 | 11/2008 | Coatney et al. |
| 7,478,266 | B2 | 1/2009 | Gatto et al. |
| 7,487,311 | B2 | 2/2009 | Stroberger et al. |
| 7,707,460 | B2 | 4/2010 | Hyde, II et al. |
| 7,797,582 | B1 | 9/2010 | Stager et al. |
| 2001/0047412 | A1 | 11/2001 | Weinman |
| 2002/0162112 | A1 | 10/2002 | Javed |
| 2003/0014523 | A1 | 1/2003 | Teloh et al. |
| 2003/0097607 | A1 | 5/2003 | Bessire |
| 2003/0204597 | A1 | 10/2003 | Arakawa et al. |
| 2004/0012316 | A1 | 1/2004 | Davis |
| 2004/0030837 | A1 | 2/2004 | Geiner et al. |
| 2004/0044649 | A1 | 3/2004 | Yamato et al. |
| 2004/0044865 | A1 | 3/2004 | Sicola et al. |
| 2004/0059844 | A1 | 3/2004 | Jones et al. |
| 2004/0064639 | A1 | 4/2004 | Sicola et al. |
| 2004/0073831 | A1 | 4/2004 | Yanai et al. |
| 2004/0153717 | A1 | 8/2004 | Duncan |
| 2004/0193802 | A1 | 9/2004 | Meiri et al. |
| 2004/0230352 | A1 | 11/2004 | Monroe |
| 2005/0005001 | A1 | 1/2005 | Hara et al. |
| 2005/0015657 | A1 | 1/2005 | Sugiura et al. |
| 2005/0027892 | A1 | 2/2005 | McCabe et al. |
| 2005/0243609 | A1 | 11/2005 | Yang et al. |
| 2005/0280421 | A1 | 12/2005 | Yomoda et al. |
| 2006/0025897 | A1 | 2/2006 | Shostak et al. |
| 2006/0031468 | A1 | 2/2006 | Atluri et al. |
| 2006/0075148 | A1 | 4/2006 | Osaki |
| 2006/0284214 | A1 * | 12/2006 | Chen ............................. 257/213 |
| 2007/0079088 | A1 | 4/2007 | Deguchi et al. |
| 2007/0094467 | A1 | 4/2007 | Yamasaki |
| 2007/0124789 | A1 | 5/2007 | Sachson et al. |
| 2007/0198613 | A1 | 8/2007 | Prahlad et al. |
| 2007/0266197 | A1 | 11/2007 | Neyama et al. |
| 2008/0001128 | A1 | 1/2008 | Goldberg |
| 2008/0004904 | A1 | 1/2008 | Tran |
| 2008/0061963 | A1 | 3/2008 | Schnitz et al. |
| 2008/0104443 | A1 | 5/2008 | Akutsu et al. |
| 2008/0177964 | A1 | 7/2008 | Takahashi et al. |
| 2008/0201390 | A1 | 8/2008 | Anguelov |
| 2008/0263363 | A1 | 10/2008 | Jueneman et al. |
| 2008/0297346 | A1 | 12/2008 | Brackman et al. |
| 2009/0007192 | A1 | 1/2009 | Singh |
| 2009/0094425 | A1 | 4/2009 | Winokur |
| 2009/0216969 | A1 | 8/2009 | Winokur |
| 2009/0287967 | A1 | 11/2009 | Winokur |

FOREIGN PATENT DOCUMENTS

| | | |
|---|---|---|
| JP | H05-233413 | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2006/111958 A2 | 10/2006 |
| WO | 2008/049703 A2 | 5/2008 |

OTHER PUBLICATIONS

International Application PCT/IL2006/000453 International Preliminary Report on Patentability dated Nov. 1, 2007.
International Application No. PCT/IL2008/001052 Search Report dated Nov. 19, 2008.
Chinese Patent Application No. 200680017546.1 Official Action dated Dec. 26, 2008.
Goldfire Ltd., "Technology and Solutions Developed for Our Clients", Brussels, Belgium, 2009.
Firetrust, "FireTrust Technology", Brussels, Belgium, 2009.
International Application No. PCT/IL2006/000453 Search Report dated Mar. 9, 2007.
Russian Patent Application No. 2007141777 Official Action dated May 6, 2009.
U.S. Appl. No. 61/231,025 "Determining Data Gap in Asynchronous Data Replication" filed Aug. 4, 2009.
International Application No. PCT/IB2010/050041 "Disaster-proof data recovery" filed on Jan. 7, 2010.
EMC Corporation, "EMC SRDF Family: High-Performance remote replication for business continuity", USA (Sep. 6, 2006).
IBM Corporation, "Storage Solutions: Data Encryption within the Drive Itself", USA (Sep. 6, 2006).
U.S. Appl. No. 10/585,587 Official Action dated Aug. 20, 2009.
European Patent Application No. 06728254.1 Supplementary Search Report dated Aug. 19, 2009.
"Flexible Min-K: Product Information", Thermal Ceramics Inc, Jan. 2008.
European Patent Application No. 06728254.1 Official Action dated Sep. 3, 2009.
International Application PCT/IB2009/051919 Search Report dated Oct. 16, 2009.
European Patent Application No. 06728254.1 Official Action dated Jan. 22, 2010.
EP Application # 11150100.3 Partial Search Report dated Mar. 1, 2011.
International Application PCT/IB2010/050041 Search Report dated Jun. 8, 2010.
International Application PCT/IB2009/055961 Search Report dated Jun. 24, 2010.
Japanese Application # 2008-507263 Official Action dated Jul. 1, 2011.
Russian Patent Application # 2009126283 Official Action dated Sep. 7, 2010.
U.S. Appl. No. 12/721,580 Official Action dated Sep. 28, 2010.
U.S. Appl. No. 12/228,315 Official Action dated Sep. 9, 2010.
ANSI/INCITS standard 269-1996, "Information Technology—SCSI-3 Fibre Channel Protocol (FCP)", American National Standards Institute (ANSI) and the International Committee for Information Technology Standards (INCITS), Apr. 8, 1996.
International Application PCT/IB2010/055421 filed on Nov. 25, 2010.
International Application PCT/IB2010/053427 Search Report dated Dec. 27, 2010.
U.S. Appl. No. 12/228,315 Official Action dated Feb. 18, 2011.
U.S. Appl. No. 12/721,580 Official Action dated Feb. 23, 2011.
Russian Patent Application No. 2009126283 Official Action dated Mar. 1, 2011.
Nadporojski, G., "Review of GSM-telephone Benefon Twin+", published on http://www.ixbt.com, Jan. 9, 2001.
U.S. Appl. No. 12/463,438 Official Action dated Mar. 4, 2011.
EP Patent Application # 08789728.6 Search Report dated Jan. 16, 2012.
EP Patent Application # 09750209.0 Search Report dated Jan. 18, 2012.
U.S. Appl. No. 13/151,289 Office Action dated Aug. 13, 2012.

* cited by examiner

DISASTER-PROOF STORAGE UNIT HAVING TRANSMISSION CAPABILITIES

CROSS-REFERENCE TO RELATED APPLICATIONS

This application claims the benefit of U.S. Provisional Patent Application 61/142,410, filed Jan. 5, 2009, whose disclosure is incorporated herein by reference.

FIELD OF THE INVENTION

The present invention relates generally to data storage, and particularly to disaster-proof storage devices.

BACKGROUND OF THE INVENTION

Various techniques for protecting data against disaster events are known in the art. For example, U.S. Patent Application Publication 2009/0216969, whose disclosure is incorporated herein by reference, describes a method for data protection that uses a disaster-proof storage unit. Data is accepted for storage from one or more data sources. The data is sent for storage in a primary storage device and in a secondary storage device. While awaiting an indication of successful storage of the data in the secondary storage device, a record associated with the data is temporarily stored in a disaster-proof storage unit adjacent to the primary storage device. When an event damaging at least some of the data in the primary storage device occurs, the data is reconstructed using the record stored in the disaster-proof storage unit and at least part of the data stored in the secondary storage device.

SUMMARY OF THE INVENTION

An embodiment of the present invention provides a storage device, including:
  a memory, which is configured to receive and store data;
  a wireless transmitter, which is coupled to read and transmit the data from the memory; and
  a disaster-proof enclosure, which is surrounded by a thermally-insulating layer, contains the memory and the transmitter and is configured to protect the memory and the transmitter from environmental conditions caused by a disaster event such that the memory and the wireless transmitter remain functional during and after the disaster event and the transmitter is able to transmit at least a portion of the data to a receiver from within the disaster-proof enclosure after the disaster event.

In some embodiments, the enclosure is metallic, the thermally-insulating layer is electrically non-conducting, and the storage device includes one or more antennas, which are mounted on an exterior of the enclosure and surrounded by the thermally-insulating layer, and are coupled to transmit signals produced by the wireless transmitter. In a disclosed embodiment, the thermally-insulating, non-electrically-conductive layer includes at least one material type selected from a group of types consisting of fiberglass, basalt, silica and steel-reinforced fiberglass strips.

In some embodiments, the storage device includes one or more thermally-protective layers disposed on an interior of the enclosure. At least one of the thermally-protective layers may include a Phase Change Material (PCM). Additionally or alternatively, at least one of the thermally-protective layers may include a porous material. In a disclosed embodiment, the storage device includes a tubular pipe, which surrounds an exterior of the enclosure and contains cooling fluid for cooling the exterior.

In another embodiment, the storage device includes an electronics unit mounted in the enclosure, and an external connector for providing electrical power and/or data to the electronics unit. In an embodiment, the storage device includes a siphon-shaped connection that connects the external connector to the electronics unit. In some embodiments, at least one of the memory and the transmitter is configured to consume a first electrical power during the disaster event, and to consume a second electrical power, higher than the first electrical power, during times other than during the disaster event.

There is additionally provided, in accordance with an embodiment of the present invention, a storage device, including:
  a metallic disaster-proof enclosure;
  one or more antennas, which are mounted on an exterior of the enclosure;
  a thermally-insulating, non-electrically-conductive layer, which surrounds the disaster-proof enclosure and the antennas so as to insulate the enclosure from a high temperature caused by a disaster event; and
  an electronics unit, which is mounted in the enclosure and is configured to receive and store data and is coupled to the antennas so as to transmit a Radio Frequency (RF) signal carrying at least some of the data to a receiver following the disaster event.

There is also provided, in accordance with an embodiment of the present invention, a method for data storage, including:
  receiving and storing data in a storage device, which includes a memory and a wireless transmitter contained in a disaster-proof enclosure that is surrounded by a thermally-insulating layer;
  operating the memory and the wireless transmitter during and after a disaster event; and
  after the disaster event, reading at least a portion of the data from the memory and transmitting the portion from within the storage device using the wireless transmitter to a receiver.

There is further provided, in accordance with an embodiment of the present invention, a method for producing a storage device, including:
  mounting one or more antennas on an exterior of a metallic, disaster-proof enclosure;
  surrounding the disaster-proof enclosure and the antennas with a thermally-insulating, non-electrically-conductive layer that insulates the enclosure from a high temperature caused by a disaster event; and
  mounting in the disaster-proof enclosure an electronics unit, which receives and stores data and is coupled to the antennas so as to transmit a Radio Frequency (RF) signal carrying at least some of the data to a receiver following the disaster event.

The present invention will be more fully understood from the following detailed description of the embodiments thereof, taken together with the drawings in which:

DETAILED DESCRIPTION OF EMBODIMENTS

Overview

Embodiments of the present invention that are described herein provide data storage units that are highly resilient to various types of disaster events. In particular, the disaster-proof storage units described herein remain functional during and after the disaster event. In some embodiments, a storage unit comprises a memory, a wireless transmitter, an internal power source and possibly other electronic circuitry, all contained in a disaster-proof enclosure. The enclosure is constructed so as to protect the memory and the transmitter from environmental conditions caused by disaster events, while permitting the storage unit to transmit data to an external receiver after the disaster event.

In an example embodiment, the disaster-proof enclosure comprises a metallic inner enclosure, which may be shaped as a cylinder. One or more transmission antennas of the wireless transmitter are mounted on the exterior of the inner enclosure. The cylinder is surrounded by a thermally-insulating layer that is not electrically conducting. During a fire event, this layer reduces the temperature on the exterior of the cylinder with little or no effect on the performance of the antennas.

In some embodiments, the cylinder may be lined internally with one or more thermally-protective layers that provide additional insulation. In one embodiment, one of the internal layers comprises a Phase Change Material (PCM), and another layer comprises a porous material. Additionally or alternatively, the disaster-proof storage unit may comprise a fluid-based cooling system that cools the exterior of the cylinder.

The mechanical configurations described herein provide a high degree of protection against disaster events. As a result, the internal electronics do not merely survive the event so as to preserve the data, but remain functional and are able to transmit the data out of the storage unit after the event. The disclosed mechanical configurations are highly reliable because they do not involve any moving parts, such as valves or shutters that must shut during the disaster event.

System Description

Figure 1:
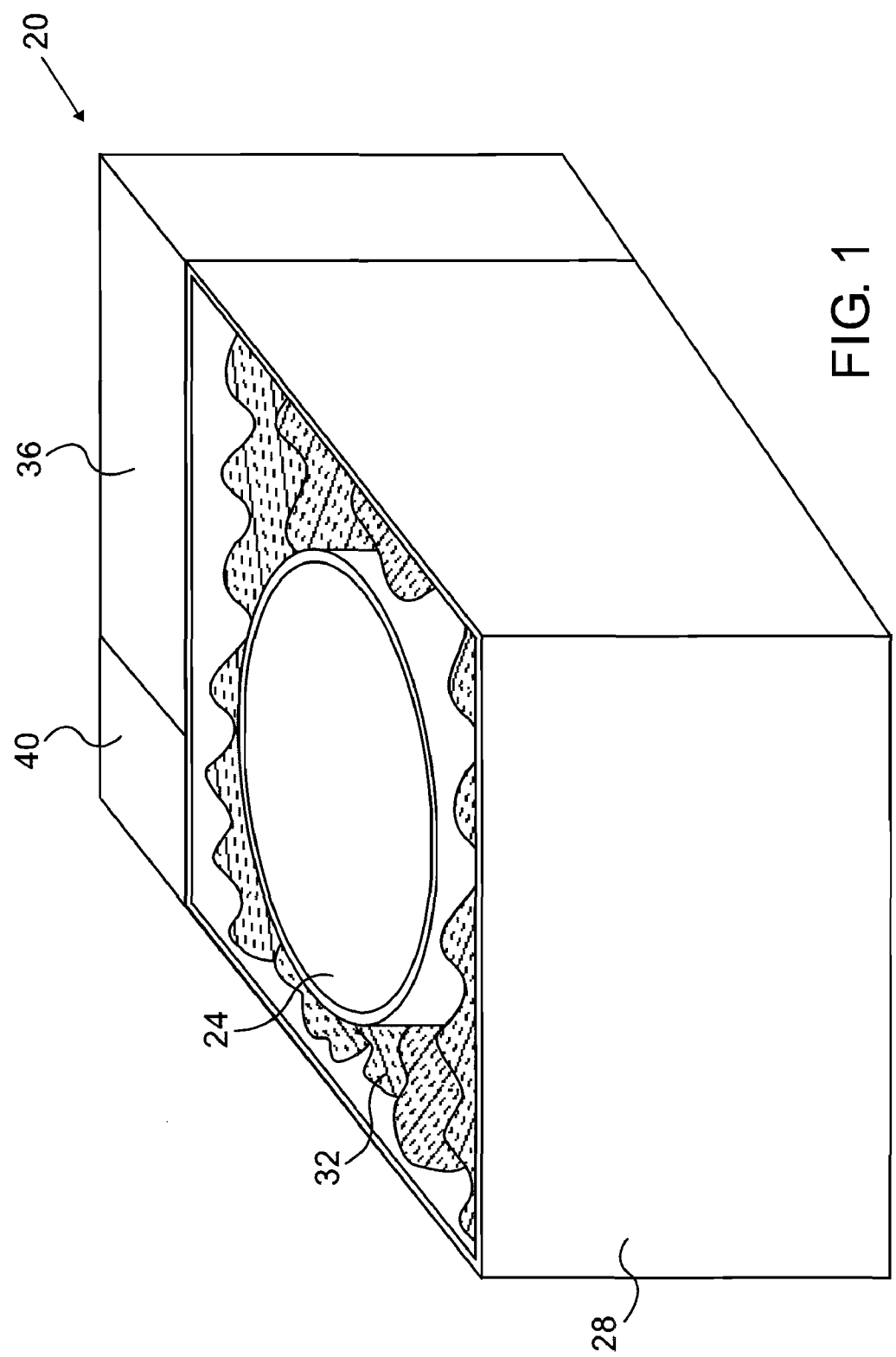
FIG. 1 is a schematic, pictorial illustration of a disaster-proof storage unit, in accordance with an embodiment of the present invention.

FIG. 1 is a schematic, pictorial illustration of a disaster-proof storage unit 20, in accordance with an embodiment of the present invention. Unit 20 is typically used for temporary storage of data, as part of a data storage system. In a typical application, unit 20 is installed in the vicinity of a primary storage device, and is used for caching data that is in the process of being mirrored to a remote secondary storage device. Applications of this sort, as well as other example applications of disaster-proof storage units, are described in U.S. Patent Application Publication 2009/0216969, cited above, and U.S. Patent Application Publication 2009/0287967 and U.S. patent application Ser. No. 12/228,315, whose disclosures are incorporated herein by reference. All of these patent applications are assigned to the assignee of the present patent application. Alternatively, disaster-proof storage unit 20 can be used for temporary or permanent storage of data in any other suitable system or application.

Unit 20 is constructed in a manner that protects its internal electrical components, as well as the stored data, from extreme environmental conditions and mechanical adversities caused by disaster events. Unit 20 is resilient against a wide variety of disaster event types, such as fire, flood, earthquake, storm, terrorist attack, explosion, vandalism and/or long power outage. Thus, unit 20 is typically fireproof, waterproof, vandal-proof, crash-proof, vibration-proof, shockproof, lightning-proof, explosion-proof and radiation-proof.

Unit 20 is disaster-proof in the sense that it enables its internal electrical components to remain functional, at least partially, during and after a disaster event. In particular, as will be shown below, unit 20 typically comprises a memory, a wireless transmitter, an internal power source, additional electronic circuitry and one or more antennas. The construction of unit 20 enables these elements to remain functional during and after a disaster event, so that the transmitter is able to transmit at least part of the stored data after the disaster event.

In the example embodiment of FIG. 1, unit 20 comprises a disaster-proof cylinder 24, which contains the memory and transmitter. The cylinder and its components are described in greater detail further below. Cylinder 24 is housed in an external case 28, e.g., a wheel-mounted case. Case 28 is typically made of material that is not electrically-conductive, such as wood or plastic, so as not to block wireless signal transmission from cylinder 24. The volume surrounding cylinder 24 in case 28 is filled with a thermally-insulating layer 32. Layer 32 typically comprises a material that is thermally-insulating but not electrically-conductive, in order to provide resilience to fire and heat while enabling signal transmission out of cylinder 24.

For example, layer 32 may comprise a flexible insulation mattress that is wrapped around cylinder 24 and provides protection against fire and heat. The mattress may comprise, for example, a combination of fiberglass, basalt, silica and/or thin fiberglass wrapping strips reinforced with steel. Mattresses of this sort are manufactured, for example, by Gold-Fire Ltd. (Brussels, Belgium). Insulating mattresses are also described, for example, in European Patent EP 1559449 and PCT International Publication WO 2008/049703, whose disclosures are incorporated herein by reference. Such mattresses can be designed to fit specific protection requirements, for example depending on the fire curve (fire temperature as a function of time), fire duration, temperature sensitivity of the protected elements, other environmental conditions, and/or any other factors. In one example embodiment, cylinder 24 is wrapped by three successive layers—a fiberglass fabric layer, a basalt fabric layer and a layer of thin fiberglass wrapping strips reinforced with steel. In alternative embodiments, layer 32 may have any other suitable composition and configuration.

The above-described configuration can withstand external temperatures on the order of 1200° C. When high temperatures develop during a disaster event, layer 32 reduces the external temperature such that the exterior of cylinder 24 has a temperature on the order of 260° C. Several example configurations of cylinder 24, which enable their internal electrical components to remain functional under such temperatures, are described further below.

In addition to providing thermal insulation, layer also functions as a shock absorber and protects cylinder 24 from mechanical shocks. The above-described configuration can typically withstand a mechanical shock on the order of 200 G. Because of its inherent flexibility, layer 32 also helps in protecting cylinder against a penetration impact followed by fire, an effect that is typical of explosion events.

In some embodiments, unit 20 comprises an external cooling system 36, e.g., a fan, air conditioner and/or heat exchanger. The operation of unit 36 is described in greater detail further below. Unit 20 may also comprise a power supply and interface module 40, which provides electrical power to cylinder 24 and routes signals between cylinder 24 and external equipment (e.g., a data storage system—not shown). System 36 and module 40 are typically active during normal operation conditions, but are not assumed to survive disaster events.

Figure 2:
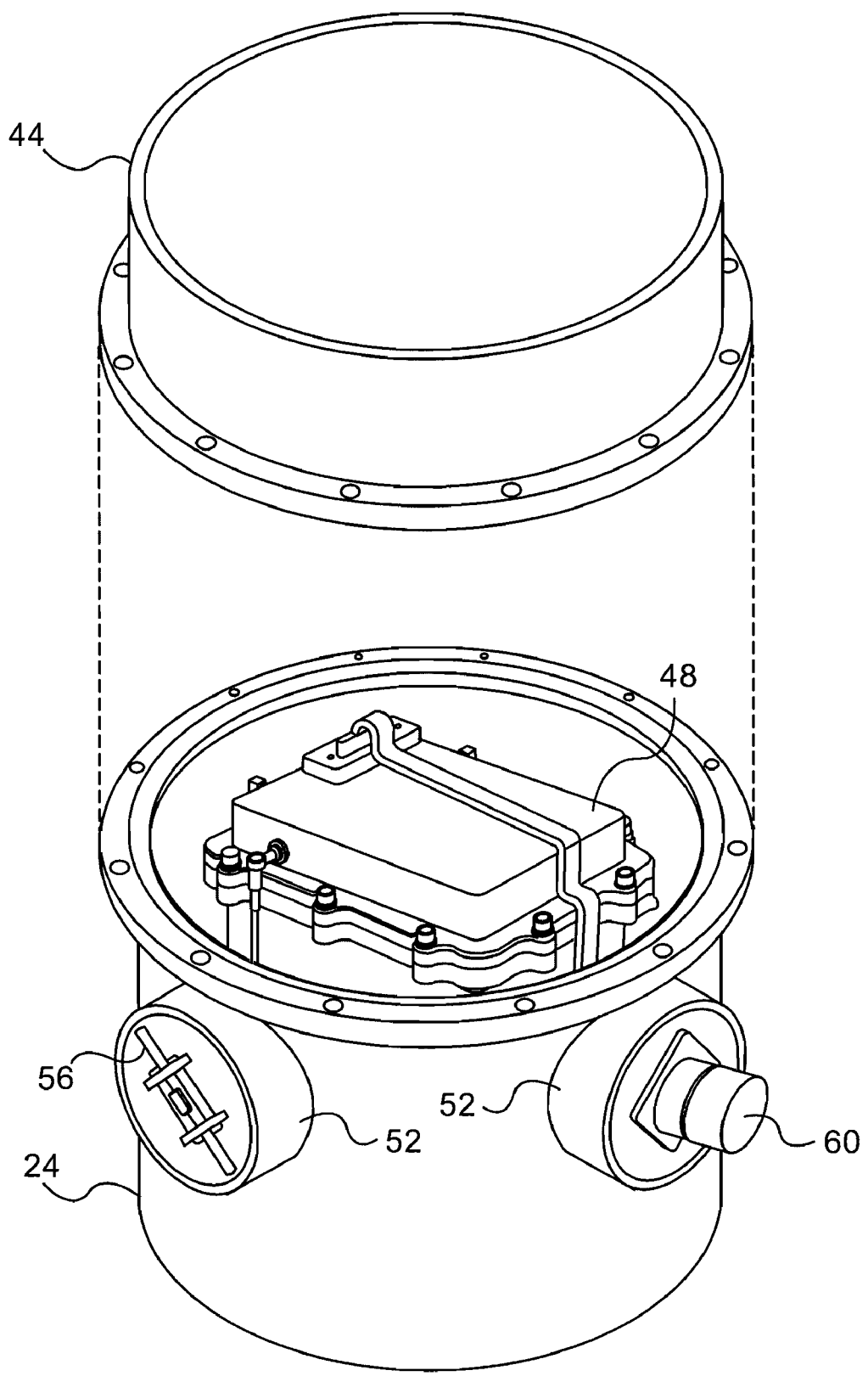
FIG. 2 is a three-dimensional views of a disaster-proof cylinder, in accordance with an embodiment of the present invention.

FIG. 2 is a three-dimensional view of disaster-proof cylinder 24, in accordance with an embodiment of the present invention. In the present example cylinder 24 is covered by a cover 44. The cover is bolted to the cylinder so as to form a hermetically-sealed enclosure. Typically, the cylinder and cover are made of metal, such as stainless steel. An electronics unit 48 is mounted inside cylinder 24. The electronics unit comprises various electronic components, such as a memory and a wireless transmitter. These elements, and the electrical configuration of unit 48, are described in FIG. 6 below.

Cylinder 24 protects unit 48 from extreme mechanical adversities associated with disaster events, such as crash, vibration, shock and penetration (piercing). In addition, the cylinder provides additional thermal insulation, which reduces the temperature experienced by the internal electrical components. In some embodiments, the cylinder is covered internally by one or more thermally-protective layers for this purpose. An example configuration of this sort is described in FIG. 4 below.

Cylinder 24 comprises four cylindrical openings 52. In the present example, three transmission antennas 56 are mounted in three of the openings, respectively. As can be seen in the figure, the antennas are fitted inside openings 52, so as to protect them from crash or other mechanical adversities. Antennas 56 are connected to the wireless transmitter in unit 48. The antennas are mounted on the exterior of the cylinder in order to enable signal transmission from the transmitter. The present example configuration uses three antennas in order to increase the likelihood that at least one antenna survives the disaster event. Typically, unit 48 can transmit signals even when only a single antenna survives. Alternatively, unit 48 may comprise any other suitable number of antennas, such as two antennas or only a single antenna.

In some embodiments, a power/data connector 60 is mounted in the fourth opening. Connector 60 is connected to a cable (not shown) that provides data and electrical power to unit 48 under normal operating conditions. The cable is typically connected to power supply and interface module 40.

In the mechanical configuration of FIG. 2, antennas and connector 60 are protected from crash and other mechanical adversities because they are mounted in openings 52. Moreover, as noted above, the exterior of cylinder 24, and in particular the antennas and connector, is surrounded by insulating layer 32. This layer provides protection against heat and fire, and also some degree of mechanical protection to the antennas and connector. The antennas are typically designed to withstand the high temperatures that develop on the exterior of cylinder 24, typically on the order of 260° C. The material composition and thickness of layer 32 are typically chosen so as to (1) reduce the effect of layer on the transmission characteristics of antennas 56, and (2) provide high thermal insulation.

Figure 3:
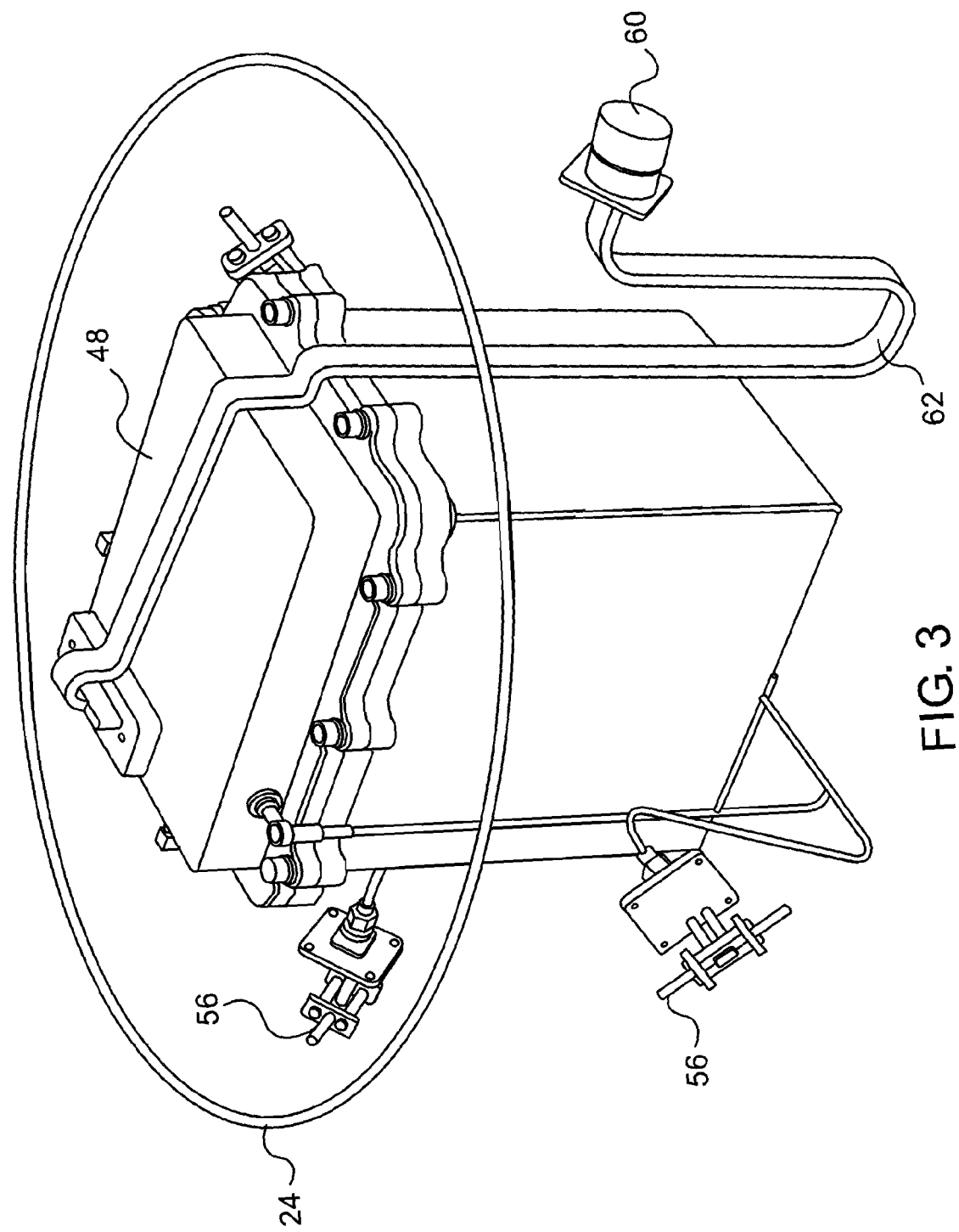
FIG. 3 is a three-dimensional views of a disaster-proof electronics unit, in accordance with an embodiment of the present invention.

FIG. 3 is a three-dimensional view showing electronics unit 48, in accordance with an embodiment of the present invention. Cylinder 24 is omitted in this view (other than the contour of its top perimeter) in order to show antennas 56, connector 60 and their interconnection to unit 48. As can be seen in the figure, antennas 56 are connected to unit 48 using coaxial cables, e.g., semi-rigid cables.

Connector 60 is connected to unit 48 using a siphon-shaped interface 62. Interface 62 typically comprises a metallic shield, which contains cables that transfer electrical power from module 40 to unit 48 and exchanges electrical signals (e.g., data and control) between unit and module 40. The siphon shape of interface 62 enables extending the length of the interface while still fitting in the volume of cylinder 24. Because of its shape and length, siphon-shaped interface 62 conducts little or no heat from connector 60 (which is exposed to the temperatures of the exterior of cylinder 24) into unit 48. Alternatively, any other shape of interface that prevents heat from being conducted into unit 48, such as various folded, bent or wrapped shapes, can also be used.

Additional Cooling Mechanisms

Figure 4:
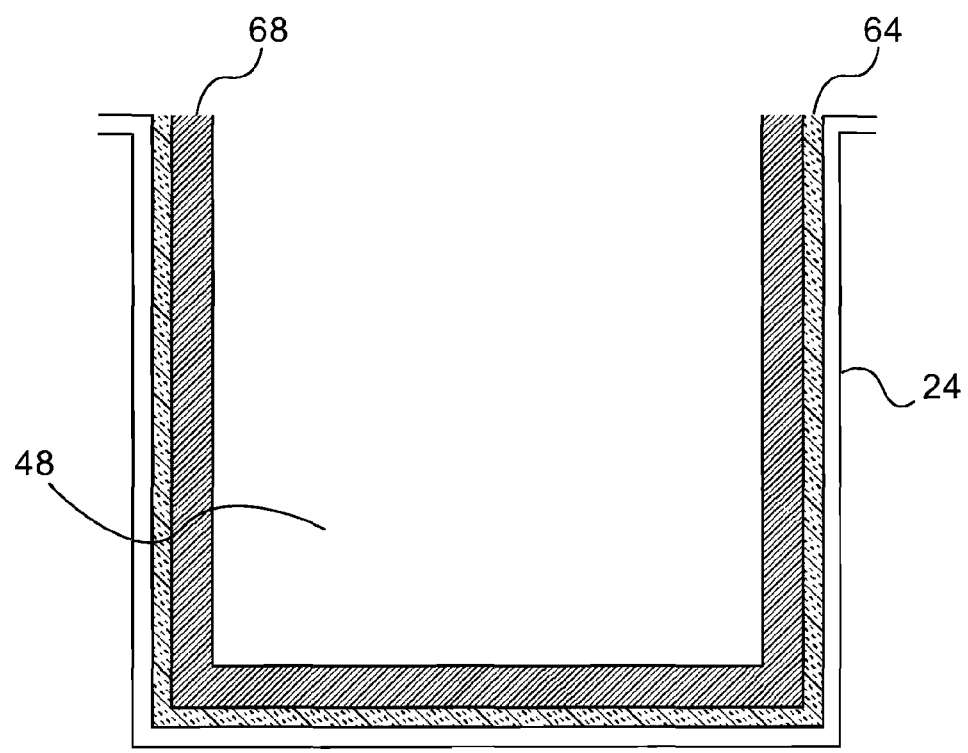
FIG. 4 is a vertical cross section of a disaster-proof cylinder, in accordance with an embodiment of the present invention.

FIG. 4 is a vertical cross section of disaster-proof cylinder 24, in accordance with an embodiment of the present invention. In some embodiments, the interior of cylinder 24 is covered with two thermally-protective layers 64 and 68. Layer 68 typically comprises a Phase Change Material (PCM). The PCM has a certain threshold temperature, at which it changes its phase from solid to liquid. Because of this property of the PCM, layer 68 performs differently under normal operating conditions and under high-temperature conditions.

Until the phase change (i.e., at temperatures that are below the threshold temperature) layer 68 remains solid. At these temperatures, layer 68 is heat absorbent and allows internal heat generated by the components of unit 48 to dissipate. When high temperature develops in a disaster event, layer 68 keeps the internal temperature of cylinder 24 steady until the layer changes phase to liquid. For example, when the temperature around layer 68 is on the order of 120° C., layer 68 will melt in at least six hours. During this time period, the temperature inside cylinder 24 will typically not exceed 65° C. At this temperature, the electronic components of unit 48 are able to continue functioning. In the present example, layer 68 has a thickness of 40 mm, although any other suitable thickness can also be used.

Layer 64 typically comprises a porous material. An example material is "Min-K" produced by Thermal Ceramics (Elkhart, Ill.), although any other suitable material can also be used. In the present example, layer 64 has a thickness of 20 mm, although any other suitable thickness can also be used. When high temperatures develop, e.g., in a fire event, layer 64 reduces the temperature provided by layer 32 of FIG. 1 (on the order of 260° C., as described above) to approximately 120° C. This temperature can be handled by layer 68 for a substantial period of time, typically for several hours. During this period, the electrical components of unit 48 remain functional. The layer configuration shown in FIG. 4 is shown purely by way of example. In alternative embodiments, the interior of cylinder 24 can be covered with one or more thermally-protective layers on any suitable thickness and composition.

In a typical implementation, the electronic circuitry in unit 48 has a power consumption of approximately 17 W. This power consumption may generate an amount of heat that can be dissipated by layer 68 but not by layer 64. In other words, the internally-generated heat typically remains inside cylinder 24. In these cases, the structure of unit 48 transfers the heat out of unit 48, to be dissipated inside cylinder 24. Under high-temperature conditions, e.g., during a disaster, cylinder may provide thermal isolation but not cooling. Therefore, the electrical circuitry of unit 48 may be designed to operate at a lower power consumption (e.g., 10W) when a disaster event occurs.

In an alternative embodiment, layer 32 of FIG. 1 reduces the temperature on the exterior of cylinder 24 to an order of 60° C. In this embodiment, layers 64 and 68 can be omitted. On the other hand, the mass (e.g., thickness) of cylinder 24 may have to be increased in order to allow it to absorb the heat for a long period of time (e.g., on the order of six hours).

Figure 5:
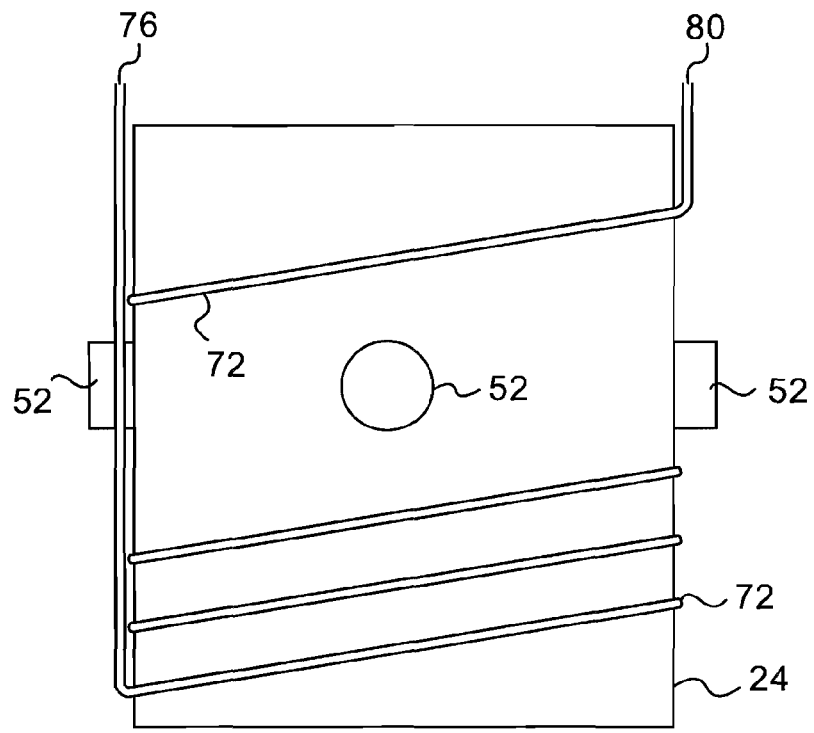
FIG. 5 is a side view showing a cooling system for a disaster-proof cylinder, in accordance with an embodiment of the present invention.

FIG. 5 is a side view showing an additional cooling system for disaster-proof cylinder 24, in accordance with an embodiment of the present invention. In this embodiment, a tubular water pipe 72 is wrapped around cylinder 24. Cooled water enters the water pipe at an entry point 76. The water flows in pipe 72, absorbs heat from the cylinder, and exit at an exit point 80. The water exiting at point 80 is typically cooled by external cooling system 36 of FIG. 1, and is then fed back to entry point 76.

In an example embodiment, water pipe 72 comprises a copper or rubber pipe whose internal diameter is 6mm. The water entering pipe 72 at point 76 is at a temperature of approximately 18° C., and the water exiting the pipe at point 80 is at a temperature of approximately 23° C. Alternatively, any other suitable configuration can be used. For example, the cooling system may use any other suitable type of cooling fluid instead of water. Typically, the cooling system of FIG. 5 is functional during normal operation (when system 36 is operational), but is not assumed to survive disaster events. The additional cooling provided by the cooling system of FIG. 5 enables the electronic circuitry of unit 48 to consume more power, and thus generate more internal heat, during normal operation. When a disaster even occurs, the power consumption of unit 48 may be reduced in order to reduce the internally-generated heat.

Electronics Unit Configuration

Figure 6:
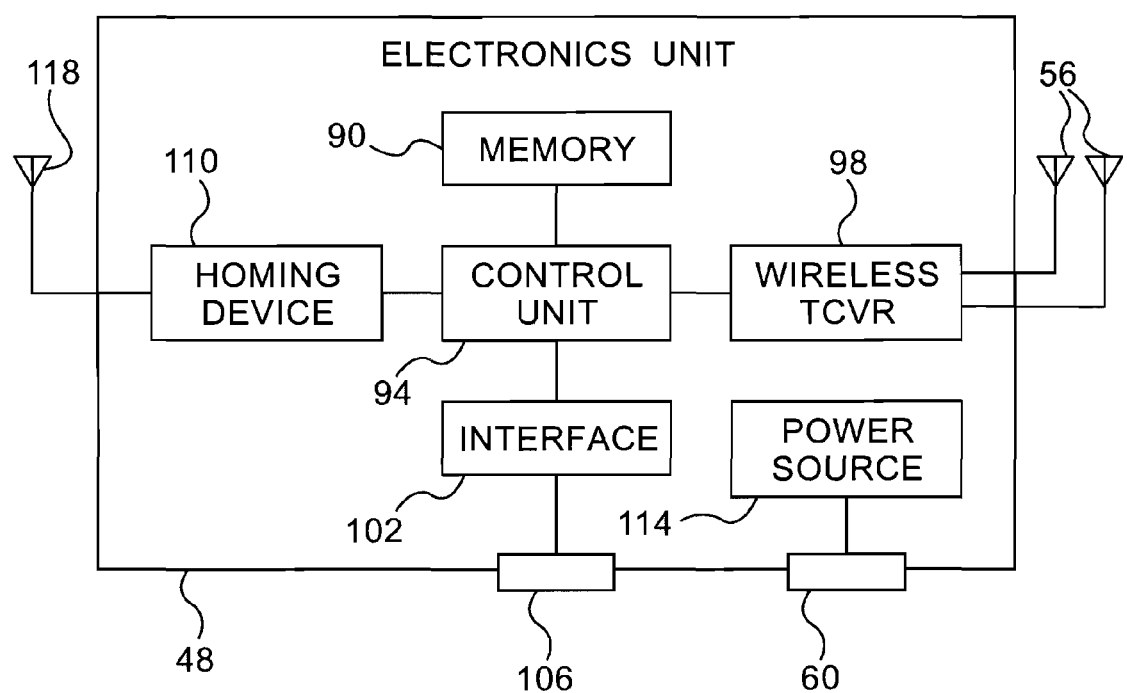
FIG. 6 is a block diagram that schematically illustrates a disaster-proof electronics unit, in accordance with an embodiment of the present invention.

FIG. 6 is a block diagram that schematically illustrates electronics unit 48, in accordance with an embodiment of the present invention. In the configuration of FIG. 6, unit 48 comprises a memory 90, which stores the data provided to unit 20 for caching. Memory 90 may comprise, for example, one or more non-volatile memory devices. A wireless transmitter/receiver (TCVR) 98 transmits data that is stored in memory 90 to a receiver (not shown) following a disaster event, in order to enable data reconstruction. TCVR 98 modulates the data onto Radio Frequency (RF) signals and transmits the RF signals via antennas 56. TCVR 98 may comprise a cellular transmitter or any other suitable transmitter type.

An interface 102 exchanges data and control information with the external data storage system via a data/control connector 106. (In the configuration of FIGS. 2 and 3 above, connector 60 is used for both power and data/control signals. Alternatively, two separate connectors can be used such as in FIG. 6.) In some embodiments, unit 48 comprises a homing device 110 that is connected to an antenna 118, for locating the disaster-proof storage unit after the disaster event.

Unit 48 comprises an internal power source 114, such as a battery. The internal power source provides electrical power to unit 48 during and after a disaster event, so that the unit can remain functional (and in particular transmit data using TCVR 98 after the disaster event). In some embodiments, unit 48 is powered by external power via connector 60 during normal operation, and switches to internal power source 114 when a disaster event occurs (e.g., when external power is disrupted). In some embodiments, the different components of unit 48 are fabricated on a single Printed circuit Board (PCB), and the internal power source comprises a battery that is mounted on the PCB.

A control unit 94 manages the operation of unit 48. In particular, the control unit receives data for caching via interface 102 and stores the data in memory 90. Following a disaster event, control unit 94 provides at least some of the data to TCVR 98 for transmission. Additional aspects related to the functionality and operation of the different elements of unit 48 are described in U.S. Patent Application Publications 2009/0216969 and 2009/0287967, and U.S. patent application Ser. No. 12/228,315, cited above.

In a typical scenario, TCVR 98 begins transmission only after the disaster event. Generally, however, the methods and systems described herein are not limited to these sorts of scenarios. In alternative embodiments, transmission may also take place during the disaster event, both during and after the event, or even before the event. For example, U.S. Patent Application Publication 2009/0216969, cited above, describes a scenario in which an approaching disaster event is predicted, and the disaster-proof storage unit begins to transmit its cached data before the event hits the primary storage device. In some embodiments, unit 48 can be triggered to start transmitting the stored data at any desired time, using a triggering signal that is transmitted to TCVR 98 over the wireless channel.

In some embodiments, cylinder 24 comprises an additional connector (not shown in the figures), for extracting data from unit 48 when the cylinder is retrieved after disaster. This additional connector is designed to withstand the high temperatures that develop on the exterior of cylinder 24, typically on the order of 260° C.

The embodiments described herein are shown purely by way of example. In alternative embodiments, the disaster-proof storage unit may comprise any other suitable enclosure, which protects the internal electronics (e.g., memory and transmitter) such that the internal electronics remain functional during and after the disaster event and are able to transmit data from the unit following the disaster event.

Although the embodiments described herein mainly address disaster-proof storage units, the methods and systems described herein can also be used in other applications, such as in mission-critical computing systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A storage device, comprising:
 a data connector;
 a memory, which is configured to receive via the data connector data for caching from an external data storage system, and to store the received data;

a wireless transmitter, which is coupled to read and transmit the data from the memory; and a disaster-proof enclosure, which has the data connector mounted thereon, is surrounded by a thermally-insulating layer, contains the memory and the transmitter and is configured to protect the memory and the transmitter from environmental conditions caused by a disaster event such that the memory and the wireless transmitter remain functional during and after the disaster event and the transmitter is able to transmit at least a portion of the data to a receiver from within the disaster-proof enclosure after the disaster event.

2. The storage device according to claim 1, wherein the enclosure is metallic, wherein the thermally-insulating layer is electrically non-conducting, and comprising one or more antennas, which are mounted on an exterior of the enclosure and surrounded by the thermally-insulating layer, and are coupled to transmit signals produced by the wireless transmitter.

3. The storage device according to claim 2, wherein the thermally-insulating, non-electrically-conductive layer comprises at least one material type selected from a group of types consisting of fiberglass, basalt, silica and steel-reinforced fiberglass strips.

4. The storage device according to claim 1, and comprising one or more thermally-protective layers disposed on an interior of the enclosure.

5. The storage device according to claim 4, wherein at least one of the thermally-protective layers comprises a Phase Change Material (PCM).

6. The storage device according to claim 4, wherein at least one of the thermally-protective layers comprises a porous material.

7. The storage device according to claim 1, and comprising a tubular pipe, which surrounds an exterior of the enclosure and contains cooling fluid for cooling the exterior.

8. The storage device according to claim 1, and comprising an electronics unit mounted in the enclosure, and an external power connector for providing electrical power to the electronics unit.

9. The storage device according to claim 8, and comprising a siphon-shaped connection that connects the external power connector to the electronics unit.

10. The storage device according to claim 1, wherein at least one of the memory and the transmitter is configured to consume a first electrical power during the disaster event, and to consume a second electrical power, higher than the first electrical power, during times other than during the disaster event.

11. The storage device according to claim 1, and comprising an electronics unit mounted in the enclosure, and a siphon-shaped connection that connects the data connector to the electronics unit.

12. A storage device, comprising:
a metallic disaster-proof enclosure;
one or more antennas, which are mounted on an exterior of the enclosure;
a data connector, which is mounted on the exterior of the enclosure;
a thermally-insulating, non-electrically-conductive layer, which surrounds the disaster-proof enclosure and the antennas so as to insulate the enclosure from a high temperature caused by a disaster event; and
an electronics unit, which is mounted in the enclosure and is configured to receive via the data connector data for caching from an external data storage system and to store the received data, and is coupled to the antennas so as to transmit a radio frequency (RF) signal carrying at least some of the data to a receiver following the disaster event.

13. The storage device according to claim 12, wherein the thermally-insulating, non-electrically-conductive layer comprises at least one material type selected from a group of types consisting of fiberglass basalt, silica and steel-reinforced fiberglass strips.

14. the storage device according to claim 12, and comprising one or more thermally-protective layers disposed on an interior of the enclosure.

15. The storage device according to claim 14, wherein at least one of the thermally-protective layers comprises a Phase Change Material (PCM).

16. The storage device according to claim 14, wherein at least one of the thermally protective layers comprises a porous material.

17. The storage device according to claim 12, and comprising a tubular pipe, which surrounds the exterior of the enclosure and contains cooling fluid for cooling the exterior.

18. The storage device according to claim 12, and comprising an external power connector for providing electrical power to the electronics unit.

19. The storage device according to claim 12, and comprising a siphon-shaped connection that connects the data connector to the electronics unit.

20. The storage device according to claim 12, wherein the electronics unit is configured to consume a first electrical power during the disaster event, and to consume a second electrical power, higher than the first electrical power, during times other than during the disaster event.

21. The storage device according to claim 12, and comprising a siphon-shaped connection that connects the data connector to the electronics unit.

22. A method for data storage, comprising: receiving and storing data
in a storage device, which includes a memory, a wireless transmitter contained in a disaster-proof enclosure that is surrounded by a thermally-insulating layer and a data connector that is mounted on the enclosure, receiving via the data connector data from an external data storage system for caching in the memory;
operating the memory and the wireless transmitter during and after a disaster event; and
after the disaster event, reading at least a portion of the data from the memory and transmitting the portion from within the storage device using the wireless transmitter to a receiver.

23. A method for producing a storage device, comprising:
mounting one or more antennas on an exterior of a metallic, disaster-proof enclosure;
mounting a data connector on the exterior of the enclosure;
surrounding the disaster-proof enclosure and the antennas with a thermally-insulating, non-electrically-conductive layer that insulates the enclosure from a high temperature caused by a disaster event; and
mounting in the disaster-proof enclosure an electronics unit, which receives via the data connector data for caching from an external data storage system and stores data, and is coupled to the antennas so as to transmit a Radio Frequency (RF) signal carrying at least some of the data to a receiver following the disaster event.

* * * * *